Figure 1:
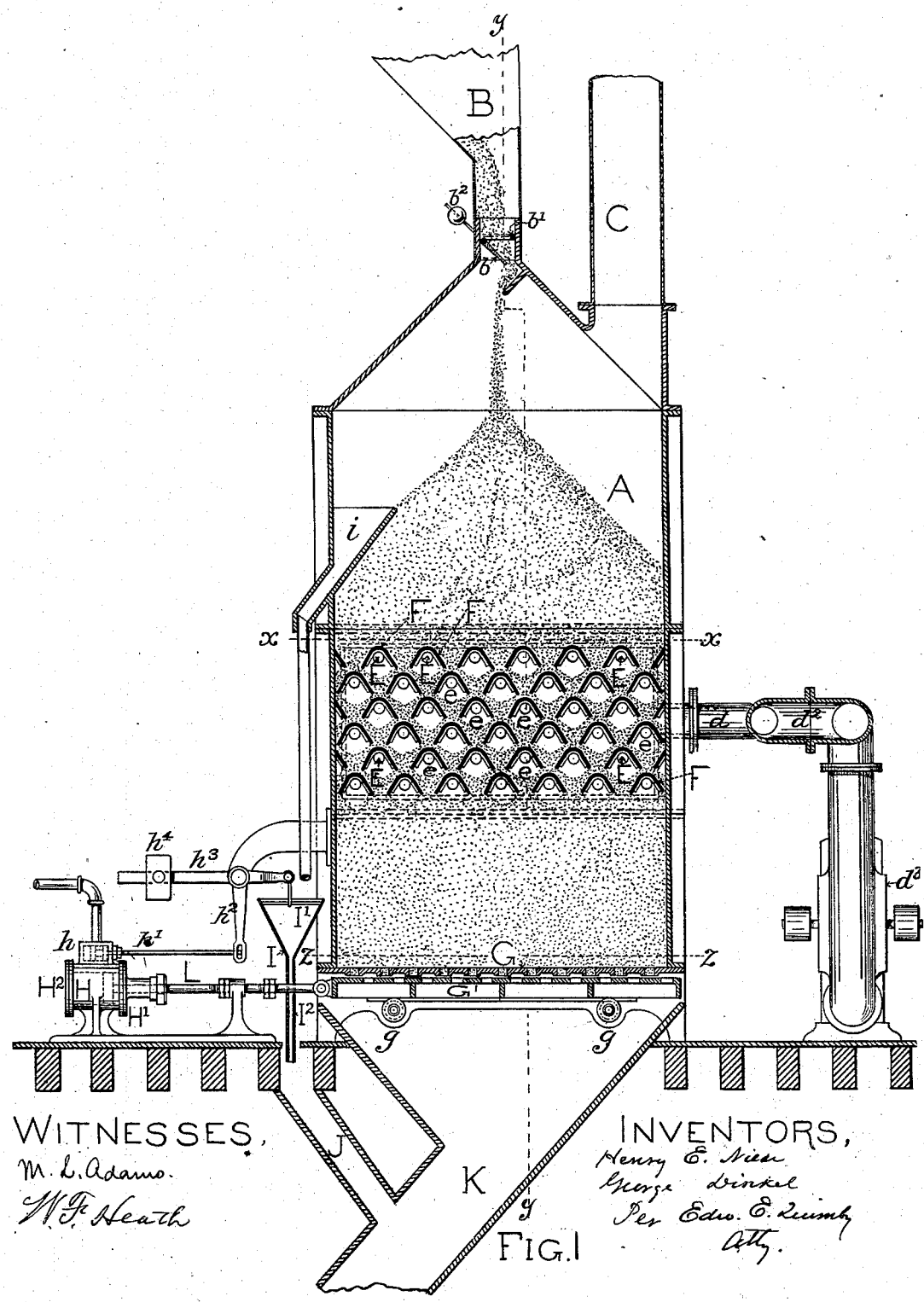

(No Model.) 2 Sheets—Sheet 1.

H. E. NIESE & G. DINKEL.
APPARATUS FOR COOLING OR DRYING GRANULAR MATERIALS.

No. 278,356. Patented May 29, 1883.

WITNESSES,
M. L. Adams.
W. F. Heath

INVENTORS,
Henry E. Niese
George Dinkel
Per Edw. E. Quimby
Atty.

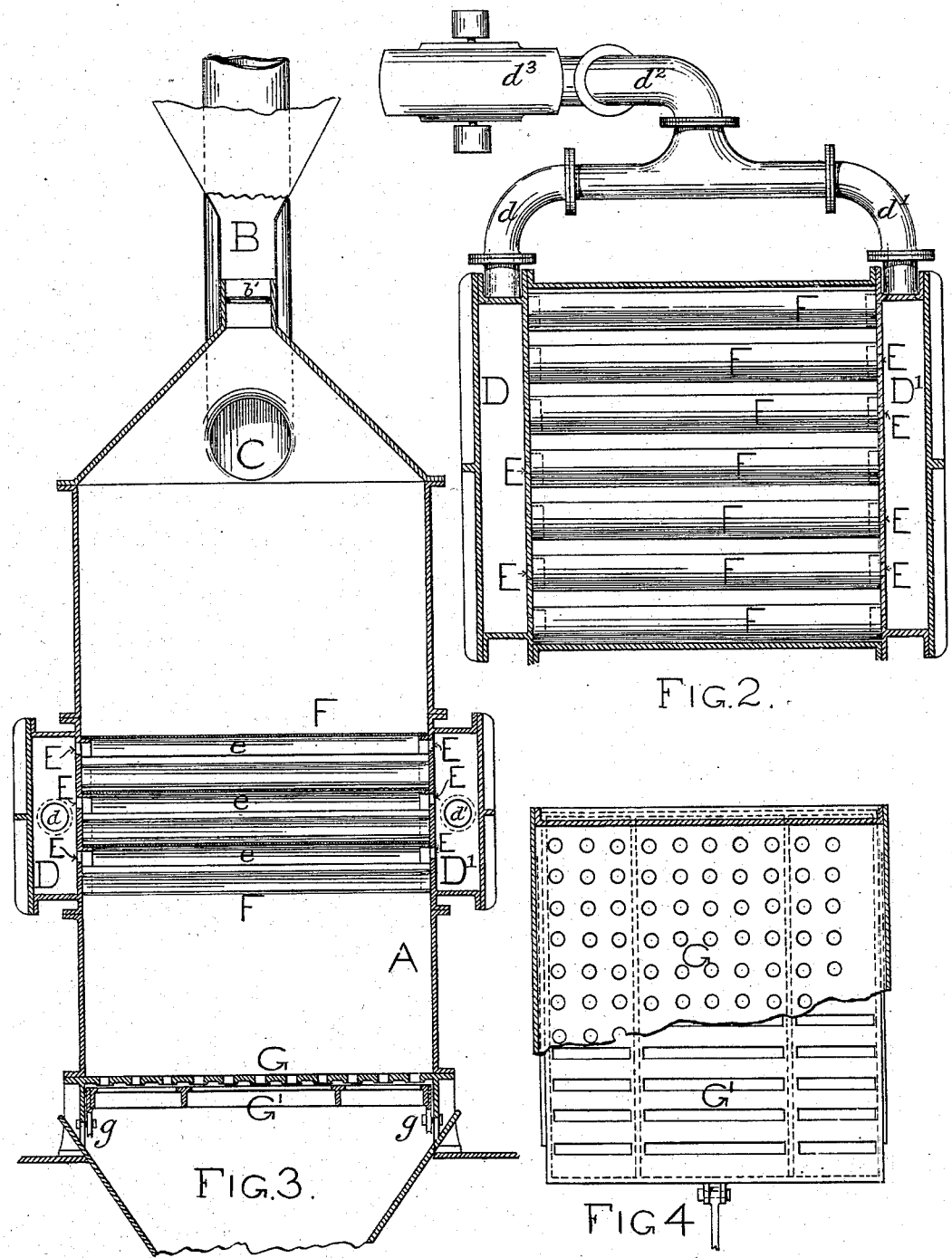

UNITED STATES PATENT OFFICE.

HENRY E. NIESE AND GEORGE DINKEL, OF JERSEY CITY, NEW JERSEY, ASSIGNORS TO THE F. O. MATTHIESSEN & WIECHERS SUGAR REFINING COMPANY, OF SAME PLACE.

APPARATUS FOR COOLING OR DRYING GRANULAR MATERIALS.

SPECIFICATION forming part of Letters Patent No. 278,356, dated May 29, 1883.

Application filed March 10, 1883. (No model.)

*To all whom it may concern:*

Be it known that we, HENRY E. NIESE and GEORGE DINKEL, both of Jersey City, New Jersey, have invented certain Improvements in Apparatus for Cooling or Drying Granular Materials, of which the following is a specification.

Our improved apparatus is especially useful for cooling the animal charcoal used in sugar-refining. It will also be found useful for employment in cases where it is desired to treat masses of any granular material with aeriform fluid, whether hot or cold.

The carrying out of our invention involves the establishment of the usual transverse air-spaces in the mass of granular material contained in the treating-chamber by the employment of superposed series of equidistantly-arranged inverted-V-shaped troughs, the ends of which are respectively joined to the opposite side walls of the treating-chamber in immediate proximity to holes in the side walls communicating with exterior air-chambers or jacketed spaces which are connected with a blower or compressor, by which the aeriform treating-fluid of any required temperature is supplied under the desired pressure.

The first part of our invention consists in the combination, with a treating-chamber such as described, of an automatic discharge-valve.

The second feature of our invention consists in automatically operating the induction-valve of an engine or motor for opening the discharge-valve of the treating-chamber by means of the overflow of granular material from the upper part of the treating-chamber.

The drawings illustrating our invention are as follows:

Figure 1 is a central vertical section of our treating-chamber, showing the motor for operating the discharge-valve and a conventional representation of a compressor for supplying the aeriform treating-fluid. Fig. 2 is a transverse section of the treating-chamber, taken through the line $xx$ on Fig. 1. Fig. 3 is a vertical section, taken through the line $yy$ on Fig. 1, in a plane at right angles with the plane of the section represented in Fig. 1. Fig. 4 is a horizontal section, taken through the line $zz$ on Fig. 1, with a portion of the perforated bottom of the tank removed to show the perforations in the discharge-valve.

The apparatus represented in the drawings consists of an upright tank or treating-chamber, A, having a pyramidal top, $a$, in the center of which is the chute B, through which the granular material to be treated is introduced into the tank. A flue, C, is also inserted in the top of the tank, and is, if desired, carried to a dust-chamber for the collection of any dust carried out through the flue C. At its lower end the chute B is provided with the weighted throttle-valve $b$, which, when the feeding operation ceases, is rocked upward against its seat $b'$ by the counterbalance-weight $b^2$, and thus prevents the dust from being blown through the chute B. On two sides the tank A is jacketed to form the air-chambers D D', which are connected by the branch pipes $d\ d'$ and main supply-pipe $d^2$ with the blower or compressor $d^3$ for supplying the chambers D D' with the aeriform treating-fluid under suitable pressure. The aeriform treating-fluid is injected from the chambers D D' through the series of holes E in the side walls of the tank A into the opposite ends of the transverse spaces $e$, formed in the mass of granular material under treatment by means of the superposed series of inverted-V-shaped troughs F, the ends of which are joined to the inner side walls of the tank A in close proximity to the holes E, respectively. The members of each horizontal series of troughs F are equidistantly arranged in the same plane in vertical alignment, respectively, with the spaces between the troughs of the adjoining series, and these spaces are of sufficient width to permit the granular material under treatment to make its way downward by its own gravity until the mass of granulated material is supported upon the perforated bottom G of the tank. The usual correspondingly-perforated horizontal slide-valve, G', is placed upon the anti-friction rollers $g\ g$, immediately beneath the perforated bottom G. The perforated valve G' is operated by a piston which reciprocates in a cylinder, H, provided with a valve-chest, $h$, containing a balanced valve, the stem $h'$ of which is loosely connected to the vertical leg $h^2$ of the pivoted T-lever $h^3$. This valve is reciprocated in one direction by the counterbalance-weight $h^4$, hung on one arm of the pivoted T-lever $h^3$, and in the other direction by the preponderating weight of granular material filling the tunnel-shaped receptacle I, suspended upon the other arm of the T-lever $h^3$. The filling of the receptacle I is effected by the overflow of the granular material from the upper part of the tank A into the chute $i$, which conducts it into the flaring upper end, I', of the receptacle I, from which the material escapes slowly through the comparatively small tube $I^2$, and falls into the chute J, which conducts it into the main chute K. When the tank A is nearly full the granular material overflows into the chute $i$, and is conducted into the receptacle I faster than it can escape therefrom through the tube $I^2$, and when full the weight of the receptacle I and its contents preponderates over the weight $h^4$, carried upon the opposite end of the T-lever $h^3$, and thus so swings the leg $h^2$ and actuates the balanced valve as to let the steam, water, or compressed air by which the motor is operated into the end H' of the cylinder H, wherein by its expansion it retracts the piston-rod L, to the outer end of which the slide-valve G' is connected. By the retraction of the piston-rod L the valve G' is pulled outward until the perforations in it are brought into alignment with the perforations in the bottom G of the tank, thus allowing the contents of the tank to escape into the main chute K. As the granular material in the tank A falls the overflow into the chute $i$ ceases. By the escape of the granular material from the receptacle I through the tube $I^2$, the weight, acting in opposition to the weight $h'$, diminishes so that the weight $h'$ preponderates and swings the leg $h^2$ in the opposite direction, thus opening the induction-port of the end $H^2$ of the cylinder H, and opening the eduction-port of the end H' of the cylinder H, thereby reversing the motion of the piston and pushing back the perforated valve G', and stopping the discharge of the granular material from the tank.

When employed for the purpose of cooling animal charcoal the blower or compressor $d^3$ may be made to draw its supply of air from any suitable cooling-chamber, and it will of course be understood that the air or other aeriform treating-fluid may be injected into the tank A under any desired degree of pressure.

It will also be understood that the number of series of transverse air-spaces formed in the mass of granular material under treatment by means of the superposed series of inverted troughs and the holes in the treating-chamber may be varied as desired.

We claim as our invention—

1. In apparatus for treating a granular material with an aeriform fluid, an automatic discharge-valve, substantially such as described, in combination with a treating-chamber provided with the herein-described mechanism for establishing air-spaces in the mass of material contained in the treating-chamber, and apparatus for introducing an aeriform treating-fluid into such air-spaces, substantially as and for the purpose set forth.

2. The tank A, provided with the chute $i$, and the valve G', connected with the piston-rod L, and the cylinder H, provided with the valve-chest $h$, containing a suitable induction and eduction valve connected with the pivoted valve-lever $h^3$, carrying at one end the weight $h'$, and at the other end the tunnel-shaped receptacle I, arranged and operating substantially as and for the purpose set forth.

H. E. NIESE.
GEORGE DINKEL.

Witnesses:
LUTHER S. ELMER,
GEORGE M. EVARTS.